United States Patent
Park et al.

(10) Patent No.: US 9,031,282 B2
(45) Date of Patent: May 12, 2015

(54) METHOD OF IMAGE PROCESSING AND DEVICE THEREFORE

(71) Applicants: LG Innotek Co., Ltd., Seoul (KR); Industry-University Cooperation Foundation Hanyang University, Seoul (KR)

(72) Inventors: Jung Ah Park, Seoul (KR); Ho Jin Jhee, Seoul (KR); Jae Ho Kwak, Seoul (KR); Whoi Yul Kim, Seoul (KR); Moon Soo Ra, Seoul (KR); Jong Min Hyun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 252 days.

(21) Appl. No.: 13/655,985

(22) Filed: Oct. 19, 2012

(65) Prior Publication Data

US 2013/0101170 A1    Apr. 25, 2013

(30) Foreign Application Priority Data

Oct. 21, 2011 (KR) ........................ 10-2011-0108378

(51) Int. Cl.
   *G06K 9/00*      (2006.01)
   *G06T 7/00*      (2006.01)

(52) U.S. Cl.
   CPC ..... *G06T 7/0079* (2013.01); *G06T 2207/10028* (2013.01); *G06T 7/004* (2013.01)

(58) Field of Classification Search
None
See application file for complete search history.

(56) References Cited

U.S. PATENT DOCUMENTS

| | | | |
|---|---|---|---|
| 2005/0151841 A1* | 7/2005 | Nelson et al. | 348/82 |
| 2005/0201612 A1 | 9/2005 | Park et al. | |
| 2005/0271279 A1* | 12/2005 | Fujimura et al. | 382/203 |
| 2011/0110585 A1 | 5/2011 | Kang et al. | |
| 2011/0190055 A1 | 8/2011 | Leyvand et al. | |

FOREIGN PATENT DOCUMENTS

| | | |
|---|---|---|
| KR | 10-2005-0089266 A | 9/2005 |
| KR | 10-2011-0051416 A | 5/2011 |

OTHER PUBLICATIONS

Kikuo et al, Estimating Pose from Depth Image Stream, Proceedings of 2005 5th IEEE-RAS International Conference on Humanoid Robots, IEEE 2005, pp. 154-160).*
Jain et al (Real-Time Upper-Body Human Pose Estimation Using a Depth Camera, Springer-Verlag Berlin Heidelberg 2011).*

(Continued)

*Primary Examiner* — Amara Abdi
(74) *Attorney, Agent, or Firm* — Saliwanchik, Lloyd & Eisenschenk

(57) ABSTRACT

An image processing method and an image processing apparatus are provided. The image processing method includes dividing the image into a plurality of regions; setting a portion of the divided regions to a first region of interest; detecting a candidate region for a target from the first region of interest; determining if the detected candidate region corresponds to the target; detecting a target region by using the candidate region if the candidate region corresponds to the target; estimating a pose of the target by using the detected target region; and performing modeling with respect to the target.

14 Claims, 20 Drawing Sheets

(56) References Cited

OTHER PUBLICATIONS

Himanshu Prakash Jain, et al: "Real-Time Upper-Body Human Pose Estimations Using a Depth Camera", Computer Vision/Computer Graphics Collaboration Techniques, Springer Berlin Heidelberg, Berlin, Heidelberg, vol. 6930, Oct. 10, 2011, pp. 227-238.

Abhishek Kar, "Skeletal Tracking using Microsoft Kinect, Course project in CS397: Special Topics in Computer Science under Dr. Amitabha Mukerjee and Dr. Prithwijit Guhu, IIT Kanpur", May 2011, pp. 1-6.

Fukimura K et al: "Estimating pose from depth image streams", Humanoid Robots, 2005 5th IEEE-RAS International Conference on Dec. 5, 2005, Piscataway, NJ, USA, IEEE, Dec. 5, 2005, pp. 154-160.

European Search Report in Application No. 12188921.6, dated Jan. 14, 2014.

Office Action dated Nov. 1, 2012 in Korean Application No. 10-2011-0108378, filed Oct. 21, 2011.

Notice of Allowance dated May 13, 2013 in Korean Application No. 10-2011-0108378, filed Oct. 21, 2011.

\* cited by examiner (a)

(b)

(a)

(b)

(c)

(d)

(e)

(f)

(a)

(b)

(a)

(b)

(c)

(a)

(b)

(c)

(d)

(a)

(b)

(c)

(a)

(b)

METHOD OF IMAGE PROCESSING AND DEVICE THEREFORE

CROSS-REFERENCE TO RELATED APPLICATION

This application claims the benefit under 35 U.S.C. §119 of Korean Patent Application No. 10-2011-0108378, filed Oct. 21, 2011, which is hereby incorporated by reference in its entirety.

BACKGROUND

The disclosure relates to an image processing method and apparatus. In more particular, the disclosure relates to an image processing method capable of detecting a target such as a person from an image having depth information and modeling the target.

A CCD camera serving as the important part of computer vision can read only a 2-D image. However, we live in a 3-D space, and, when the 3-D space must be recognized, only one camera providing a 2-D image is insufficient.

To attempt to extract 3-D information through a sensor of a camera that can receive only 2-D information, following various schemes have been developed until now.

First, there has been an attempt to measure the distance from an object by irradiating a laser beam onto the surface of the object and measuring time in which the laser beam is reflected from the object to a sensor. Although this scheme may be easily employed in order to measure the distance from the object spaced apart from the sensor by 15 m or more indoors, the resolution of 1 cm or less may not be expected. Accordingly, the scheme is not extensively used.

Second, there has been an attempt to irradiate light having a predetermined pattern onto an object to find the depth information thereof, and analyzing the distortion degree of a pattern appearing on an object surface, so that the curved degree of the object surface and the distance from the object are calculated. This scheme is the simplest scheme for implementation among other schemes. However, as the object is farther away from the camera, the resolution of the image is significantly degraded.

Third, there has been developed a scheme employing a Moire pattern. According to the scheme, light having the diffraction pattern is irradiated onto an object in order to measure the distance from the object in one direction, and the pattern of the light reflected from the object makes interference with a reference pattern in another direction. Then, the Moire pattern resulting from the interference is analyzed, so that the depth information of the object is extracted. Although the scheme employing the Moire pattern can bring the superior result representing the resolution of 10 μm, a huge amount of data computation is caused.

Fourth, there has been an attempt to irradiate a variety of lights onto an object, and detect the variation of an object surface representing various characteristics depending on the lights, thereby estimating the shape of the object. However, typical 3-D depth information cannot be extracted through this scheme.

The above schemes are to extract 3-D information by using only one camera.

Meanwhile, recently, a scheme employing two cameras by emulating the visual system of a human has been attempted.

In detail, through a stereo vision scheme employing at least two cameras, the depth information of an object can be acquired from the cameras by using the geometrical relation between left and right images taken by the two cameras and the matching relation between the left and right images. In the process of acquiring the depth information, the accurate and complex computation is required. However, in the present description, a method of detecting an object after the depth information of the object has been acquired and modeling the object will be described.

BRIEF SUMMARY

The disclosure is to increase a computational processing speed by separating a region of interest (ROI) from a region in which an object exits and image-processing the ROI, when detecting the object by using only depth information.

The disclosure is to perform a 3-D process for an image by decomposing the image into pixel sets based on sections classified based on the depth information of the image and detecting a candidate region having high possibility for the target from among the pixel sets, thereby detecting the target.

Meanwhile, the embodiments are not limited to the above object, and those skilled in the art can clearly understand other objects from following description.

According to the embodiment, there is provided an image processing method which includes acquiring depth information of an image, separating a first region of interest for a region, in which a target exists, from the image, detecting a candidate region for the target from the first region of interest, determining if the detected candidate region corresponds to the target, detecting a target region by using the candidate region if the candidate region corresponds to the target, estimating a pose of the target by using the detected target region, and performing modeling with respect to the target.

According to the embodiment, there is provided an image processing apparatus including an image acquiring module acquiring depth information of an image, a region of interest separating module separating a first region of interest for a region in which a target exists, from the image, a region detecting module detecting a candidate region for the target from the first region of interest, a matching module determining if the candidate region corresponds to the target, a pose estimating module estimating a pose of the target by using the target region which is detected by using the candidate region as the candidate region corresponds to the target, and a modeling module modeling the target.

As described above, according to the disclosure, the target can be simply and exactly detected by using only the depth information, and the target can be modeled by detecting and estimating a part of the target.

Meanwhile, other effects will be directly or indirectly disclosed in the following detailed description.

DETAILED DESCRIPTION

Hereinafter, one embodiment of the disclosure will be described. According to the disclosure, a person is employed as an example of a target in the following description, and parts of the target represent the body, the arm, and the leg of the person. The disclosure is applicable to animals, robots, and other targets as well as a person.

In addition, an image processing apparatus of the disclosure is applicable to predetermined devices, such as cameras, network cameras, computers, smart phones, network TVs, smart TVs, cellular phones, and game players, mounted thereon with processors and applications for processing photographs for the general purpose.

In addition, even though the depth information of an image according to the disclosure may be acquired from left and right cameras of a stereo camera assembly, the depth information may be acquired by a laser scanner or an ultrasonic device. In other words, the disclosure employs various schemes and devices for acquiring the depth information. In addition, the depth information may include the distance between a camera for taking an image and an object, and may be represented as a relative value in the range of 0 to 255.

Figure 3:
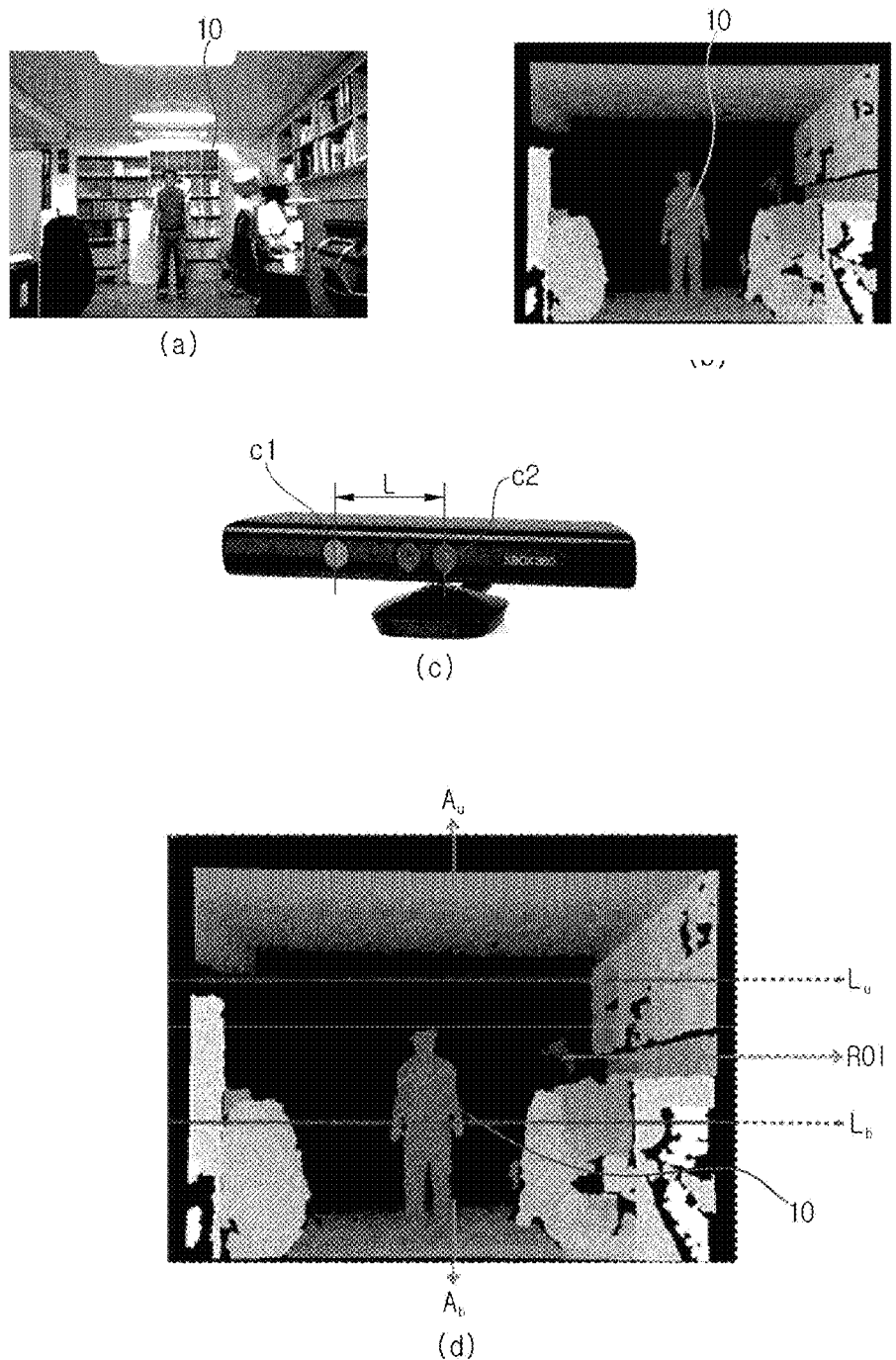
FIGS. 3 to 8 are views showing examples of images processed through a scheme of detecting a target region in the image processing method according to one embodiment of the disclosure.

Hereinafter, FIG. 3(a) shows a color image when a person is photographed as a target 10, and FIG. 3(b) shows an image expressed based on depth information. Referring to FIG. 3(b), as the contrast of the image is brightened, the depth information represents a great value, and represents that the person is closer to a camera. As the contrast of the image is darkened, the depth information is reduced, and represents that the person is farther away from the camera. Referring to FIG. 3(b), the person 10 is farther away from the camera than a surrounding object that is most brightly expressed. FIG. 3(c) shows the shape of a stereo camera assembly capable of acquiring the depth information. Two cameras c1 and c2 are spaced apart from each other by a reference distance L, and may acquire the depth information by using images taken from the cameras c1 and c2.

Meanwhile, according to the disclosure, in the process of detecting the target 10, the number (p) of pixels corresponding to a real length (R) may be estimated by utilizing the depth information (d) of the image through following Equation 1.

$$\text{The number of pixels } (p) = \text{the real length } (R) * \text{a focal length } (f)/\text{depth information } (d) \quad \text{Equation 1}$$

For example, according to the disclosure, in order to detect a person region, a rectangle is set with a predetermined width of 20 cm, and a region smaller than the rectangular region is regarded as a non-person region.

In this case, in order to calculate the number of pixels representing the length of an image corresponding to the real length of 20 cm, Equation 1 may be used.

The variation in the focal length of the camera, and the real length or the depth information used as a threshold value is reflected by Equation 1, so that the focal length of the camera, and the real length or the depth information used as a threshold value may be dynamically utilized. Accordingly, the target 10 may be easily detected by using an adaptive threshold value.

Hereinafter, the disclosure will be described with reference to FIG. 1.

Figure 1:
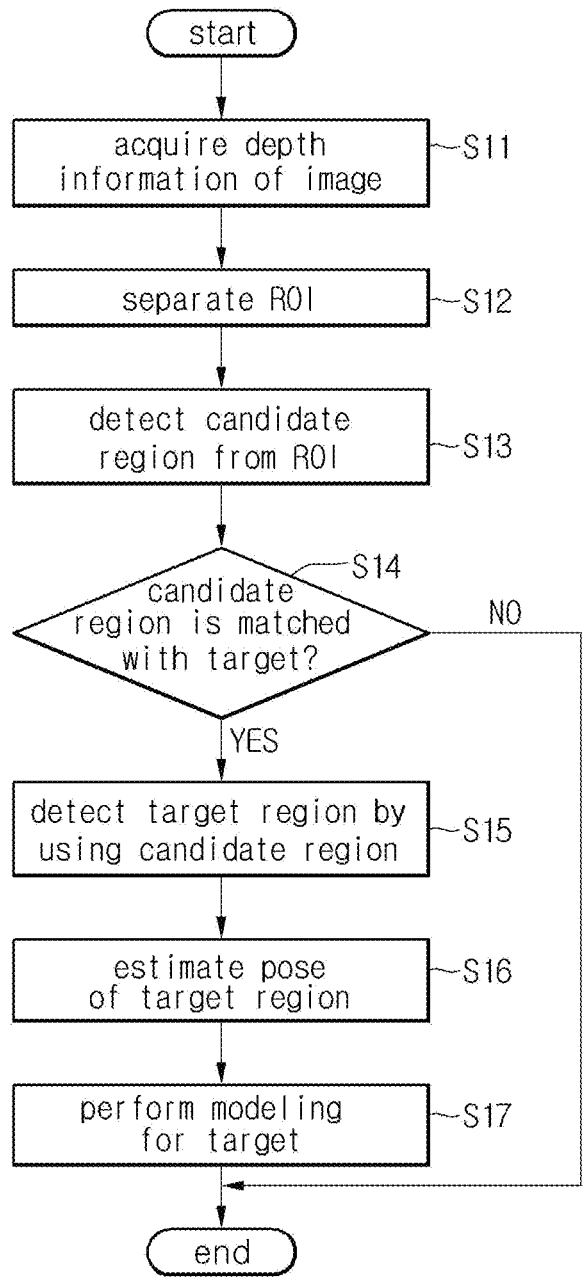
FIG. 1 is a flowchart showing an image processing method according to one embodiment of the disclosure.

FIG. 1 is a flowchart showing an image processing method according to one embodiment of the disclosure. FIG. 1 is a schematic flowchart showing the image processing method of the disclosure.

In step S11, the depth information of an image is acquired. The depth information may be distributed in a portion of the range of 0 to 255, for example, the range of 50 to 200, according to the photographing environments of an object and the performance of a camera. The depth information is acquired with respect to each pixel of the image.

In step S12, a first region of interest (ROI) for a target region is separated from the image. According to the disclosure, an intermediate region obtained by horizontally dividing the image in three equal parts may serve as the first ROI. Meanwhile, according to the disclosure, a second ROI to be described later may be an intermediate region obtained after the image has been vertically divided in three equal parts.

In step S13, a candidate region is detected from the first ROI. According to the process of detecting the candidate region, the image is divided into a plurality of pixel sets according to the depth information to create pixel objects, and a plurality of pixel objects, which have a possibility to be determined as the target 10, may be detected as the candidate regions.

In step S14, a determination is made regarding if the detected candidate region is matched with the target 10. According to the process of determining if the detected candidate region is matched with the target 10, a top point of the head is extracted from the candidate region if the target 10 is the person, and template matching is performed with respect to a predetermined region from the top point of the head, so that a determination is made regarding if the region is matched with the target 10.

In step S15, if the candidate region is matched with the target 10, the target region is detected by using the candidate region. The process of detecting the target region is to clearly detect the target region, which may be determined as the target, as a binarized image by separating the second ROI by using the width of the detected candidate region, and then performing a binarization process, a labeling process, and a noise removing process with respect to the related image In step S16, the pose of the target region is estimated by using the detected target region. The outline and the skeleton of the target region are extracted, and the part of the target region is estimated by using the outline and the skeleton, thereby estimating the pose of the target region.

In step S17, the target 10 is modeled by using the estimation result.

In the above description, the image processing method of detecting the target from the image and modeling the target has been described in brief. Hereinafter, the images processed through detailed processes of the operation of FIG. 1 will be described.

Figure 2:
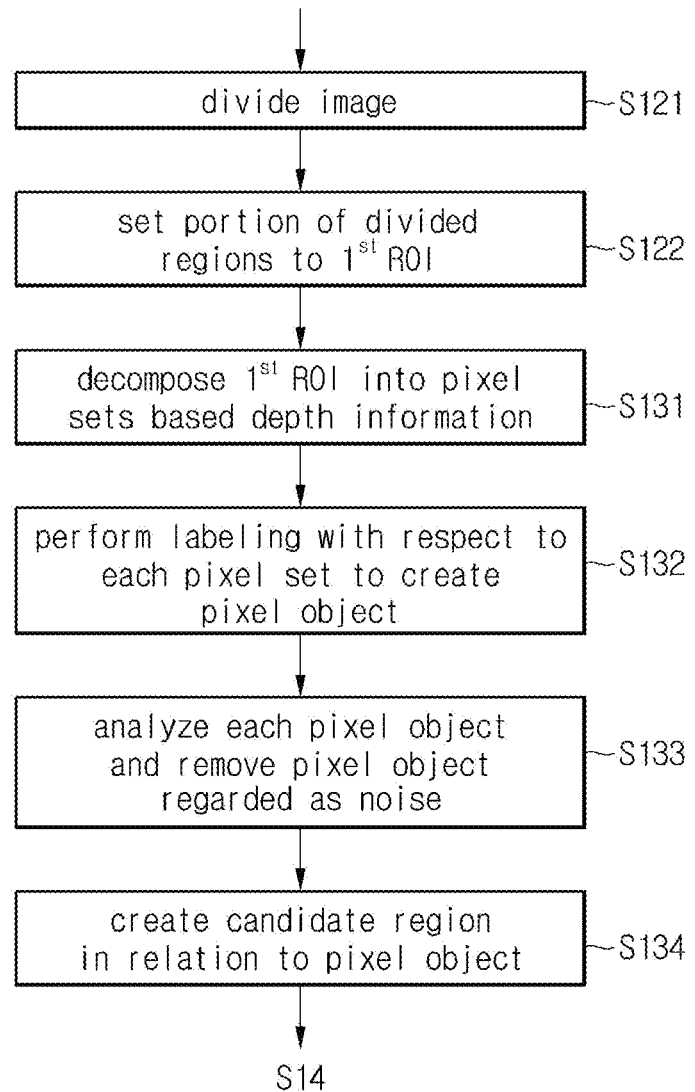
FIG. 2 is a detailed flowchart showing operations of extracting a region of interest and detecting a candidate region in the image processing method according to one embodiment of the disclosure.

FIG. 2 is a detailed flowchart showing operations of extracting a region of interest and detecting a candidate region in the image processing method according to one embodiment of the disclosure. FIGS. 3(a) to 8(b) are views showing examples of images processed through a scheme of detecting a target region in the image processing method according to one embodiment of the disclosure. The operation of FIG. 2 will be described together with the image processing schemes of FIGS. 3(a) to 9(c).

The image is divided into a plurality of regions in step S121, and the part of the divided regions is set to the first ROI in step S122.

Referring to FIG. 3(d), the image is horizontally divided into three equal parts, and the intermediate region ROI is extracted as the first ROI. In detail, reference sign Au represents an upper region of a boundary line Lu of dividing an image, and reference sign Ab represents a lower region of the boundary line Lb. In addition, the intermediate region between the boundary lines Lu and Lb is set as the first ROI.

In FIG. 3(c), the target 10 is provided at the first ROI. According to the disclosure, when a person to be detected as the target 10 is photographed, the person region may exist with high probability at the intermediate region of the image. Accordingly, the intermediate region is set as the first ROI. However, since there is no essential limitation of horizontally dividing the image in three equal parts when setting the first ROI as shown in FIG. 3(d), the first ROI may be randomly set through another division scheme or to another region.

In step S131, the image of the first ROI is decomposed into a plurality of pixel sets based on the depth information.

FIG. 4(a) is a side view showing the photographing space of the camera in a distance direction from the camera differently from the plan view of FIGS. 3(a) to 3(d). Referring to FIG. 4(a), a front point closest to the camera represents the greatest depth information, and a back point farthest away from the camera represents the least depth information. According to the disclosure, a plurality of reference values pivot 1, pivot 2, pivot 3, and pivot 4 are set with respect to the whole range of the depth information of the image from the greatest depth information to the least depth information, and the plural pixel sets are extracted from preset sections (first to fourth sections).

For example, when acquiring an image having the depth information ranging from the maximum value of 200 to the minimum value of 50, the depth information of 200 to 170 may be set as the first section, the depth information of 185 to 155 may be set as the second section, and the depth information of 170 to 140 may be set as the third section. Next, the pixel sets having the depth information in the first, second, or third section may be extracted according to the sections.

In this case, the setting of the unit section based on a reference depth value pivot will be described with reference to FIG. 4(b).

A section having the range of the depth value increased by 15 from the reference depth value pivot and the depth value decreased by 15 from the reference depth value pivot may be set as one unit section. In other words, the size of the unit section may be the depth value of 30.

Although the size of the unit section is set to 30 in the present description, the disclosure is not limited thereto. In other words, the size of the unit section may be adaptively calculated based on the real thickness of a person through Equation 1. For example, if the real thickness of the normal person is 20 cm or less, the value of 20 cm is applied to Equation 1, and the depth information corresponding to the value of 20 cm may be calculated.

Meanwhile, the pixel sets having a predetermined depth value may be extracted from each section unit while representing the form of a cluster or while representing the form of distributed groups. In addition, as shown in FIG. 4(a), each section may be overlapped with an adjacent section by ½. If the sections are continuously set without overlapping with each other, or if the sections are set without the empty space between the sections, omitted pixels may be caused. In addition, the same object may be decomposed by the decomposition of the sections, so that the decomposed parts of the object are scattered in the form of pixel sets in different sections. In this case, the detection of the object may be difficult.

In other words, the interval between the reference depth values must be set to be equal to or smaller than the size of the unit section, thereby inhibiting the target from being decomposed into different sections, and inhibiting pixels from being omitted in the computational process.

Figure 5:
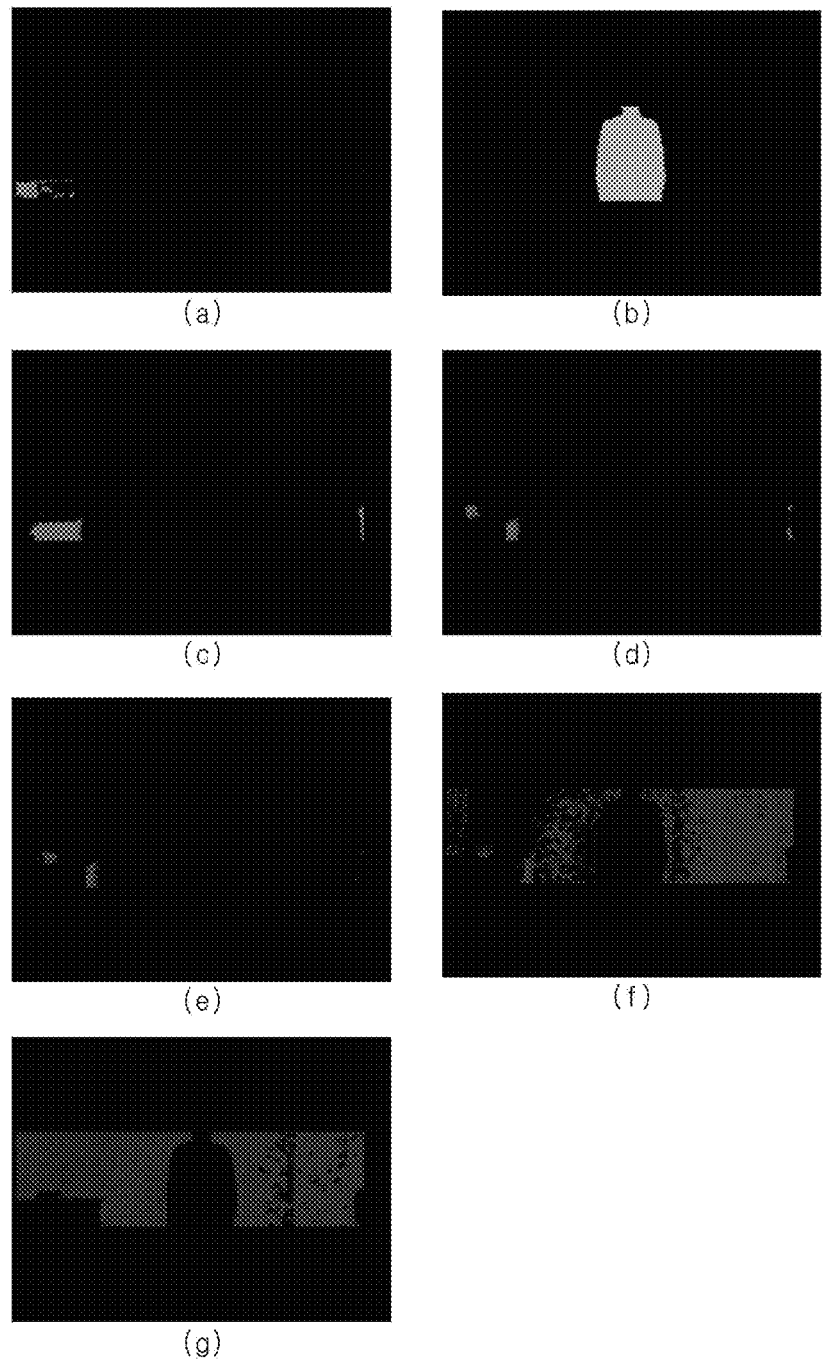

FIG. 5 shows pixel sets decomposed into the sections. FIG. 5(a) is a view showing a pixel set having depth information in the first section, FIG. 5(b) is a view showing a pixel set having depth information in the second section, and FIG. 5(c) is a view showing a pixel set having the depth information in the third section. FIG. 5(d) is a view showing a pixel set having depth information in the fourth section, FIG. 5(e) is a view showing a pixel set having depth information in the fifth section, FIG. 5(f) is a view showing a pixel set having the depth information in the sixth section, and FIG. 5(g) is a view showing a pixel set having the depth information in the seventh section. Referring to FIG. 5, the pixel set extracted from the second section approximately represents the target region.

Alternatively, after the image is decomposed into a plurality of pixel sets as shown in FIG. 5, the pixel set representing the higher probability for the existence of the target may be removed. For example, the size of the pixel set may be set to an excessively small value. Accordingly, if the number of pixels constituting one pixel set is less than a threshold value as shown in Equation 2, the computational amount can be reduced by removing the pixel set.

The number of pixels/the number of pixels constituting the first ROI<the minimum threshold value/ the number of pixels constituting the first ROI.  Equation 2

Therefore, Equation 2 is applied to the pixel set obtained in FIG. 5, so that the pixel set satisfying a predetermined condition is removed.

In step S132, each decomposed pixel set is labeled so that at least one pixel object is created. In other words, the center of the gravity of each pixel set is calculated so that the excessive small pixel set is merged into a large pixel set or removed, thereby creating the pixel object based on each pixel set.

The pixel object described in the present description may be defined as the form of a pixel group including a plurality of pixels or a pixel cluster, and a determination may be made that the pixel sets constitute the same object due to the same depth information or similar depth information.

In step S133, the pixel object is analyzed, so that the pixel object determined as noise is removed.

In this case, an operation of determining a pixel object satisfying a predetermined condition as noise and removing the pixel object may be performed, and the operation will be described below.

A first condition may be set as a case in which the number of pixels constituting at least one pixel object is equal to or less than a preset threshold value. For example, if a person has been detected, the number of pixels constituting the pixel object may exceed a predetermined value. For example, the number of pixels constituting a square having a width of 20 cm is found through Equation 1. If the number of pixels constituting the pixel object is less than 20, the pixel object may be regarded as a meaningless pixel object and removed.

Referring to FIG. 6(a), since a pixel object N1 has a small size, the number of pixels is equal to or less than the threshold number of pixels. Accordingly, the pixel object N1 is regarded as noise.

The second condition may be set to a case in which the width of a rectangle surrounding the outline of at least one pixel object may be equal to or less that a preset threshold value. In this case, if a person is detected, the width of the person may have a specific length, for example, may be equal to or less than 20 cm. The number of pixels corresponding to 20 cm may be calculated through Equation 1. Referring to FIG. 6(b), since the width of a pixel object N2 is equal to or less than 20 cm, the pixel object N2 is regarded as noise and removed.

Figure 6:
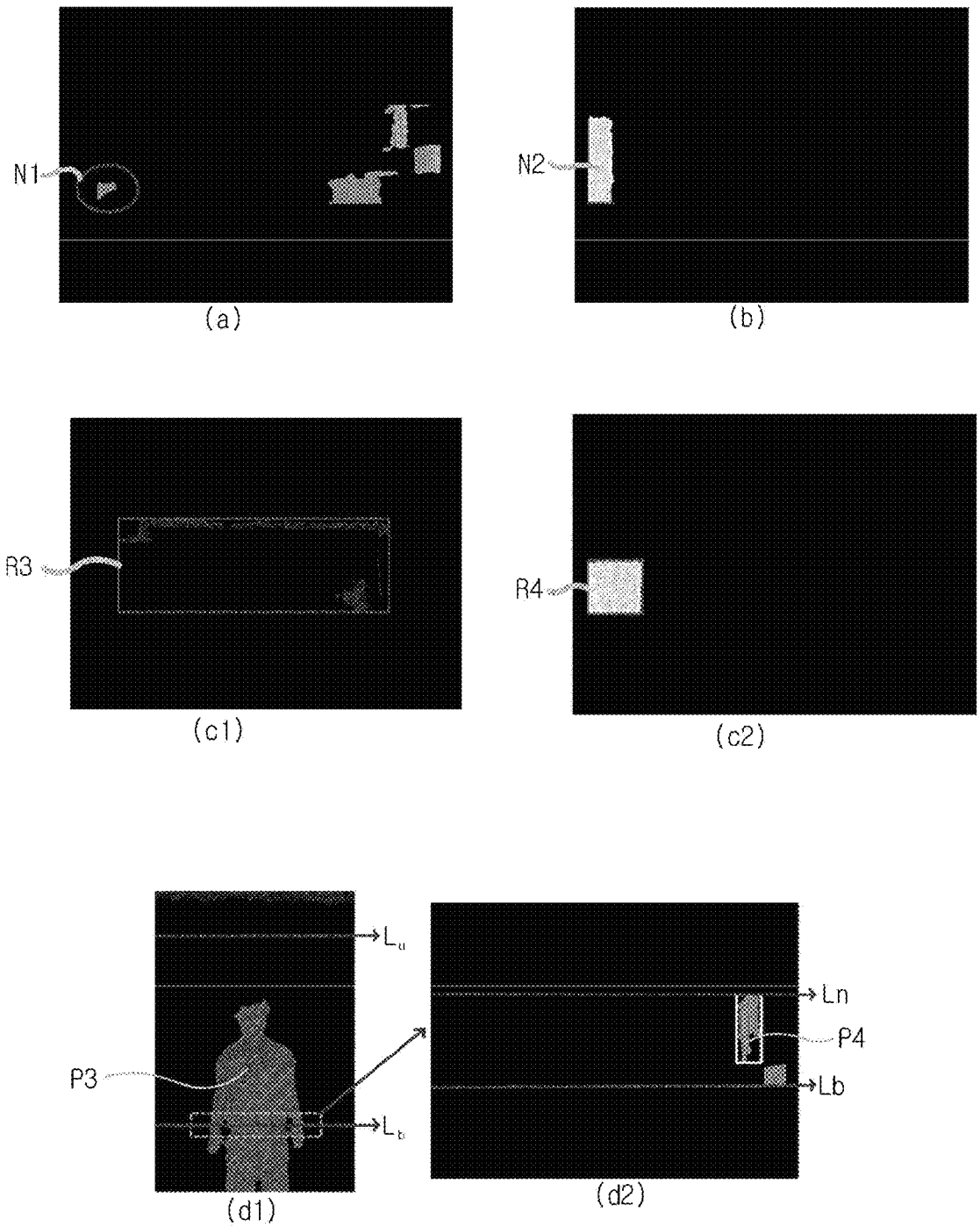

The third condition may be set to a case in which the pixel number ratio of pixels contained in the rectangle surrounding the outline of at least one pixel object is out of a preset threshold range. Referring to FIGS. 6(c1) and 6(c2), a rectangle R3 surrounding the outermost part of pixels may be set, and a determination may be made regarding if the pixel number ratio of the pixels contained in the rectangle R3 is a preset threshold ratio. The pixel number ratio may be the ratio of the number of pixels contained in the rectangle R3 to the number of pixels constituting the rectangle R3. A condition of determining if the pixel number ratio is out of the preset threshold range may be represented through Equation 3.

The number of pixels in a rectangle/the number of pixels of a rectangle<the minimum threshold value, or, the number of pixels in the rectangle/the number of pixels of a rectangle>the maximum threshold value(minimum threshold value: 0.35, maximum threshold value:0.9)   Equation 3

Referring to FIG. 6(c1), the pixel number ratio is equal to or less than the minimum threshold value. FIG. 6(c2) represents that the pixel number ratio is equal to or greater than the maximum threshold value. When a person is detected as a target, the shape of the upper body of the person is similar to the shape of an omega (Ω). Accordingly, when the pixel number ratio is equal to or greater than the maximum threshold value, the shape of the pixels approximates the rectangle. Therefore, the target may be not a person. In addition, if the pixel number ratio is equal to or less than the minimum threshold value, the target may not be a person. Since the minimum threshold value and the maximum threshold value may be adaptively set based on the shape of a rectangle and the shape of a person, the disclosure is not limited to the values illustratively given in Equation 3

Finally, the fourth condition may be set to a case in which at least one portion of the pixel object may be spaced apart from a portion of the boundary line of dividing the pixel object into a plurality of regions. FIG. 6(d1) shows that a pixel object P3 meets the division boundary line Lb. When detecting the standing-up person, the lower body of the person may meet the lower boundary line Lb among the division boundary lines La and Lb. Accordingly, since the pixel object P3 shown in FIG. 6(d1) does not satisfy the fourth condition, the pixel object P3 remains without being removed. If the pixel object P4 is spaced apart from the boundary line Lb, the pixel object P4 is regarded as noise and not a person, so that the pixel object P4 may be removed. FIG. 6(d2) shows a case in which the pixel object P4 is spaced apart from the boundary line Lb, and the pixel object P4 may be regarded as noise and removed.

As a result, in step S133, a pixel object satisfying one of the first to fourth conditions may be determined as noise and removed.

Figure 7:
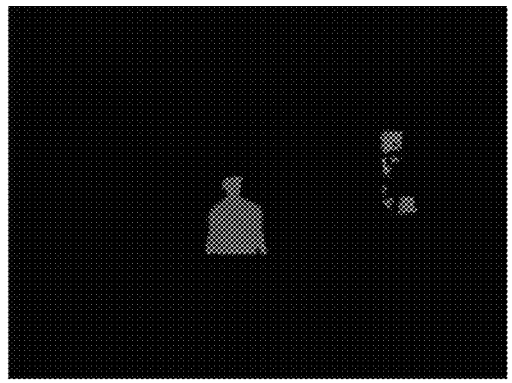
Figure 7:
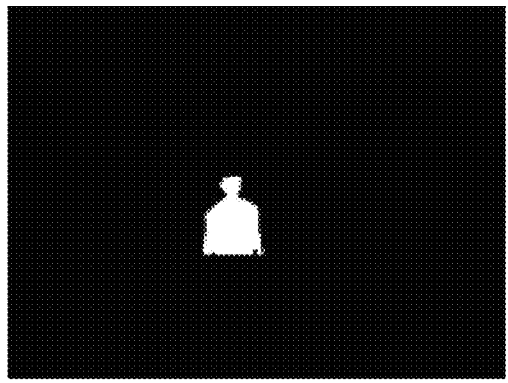
Figure 7:
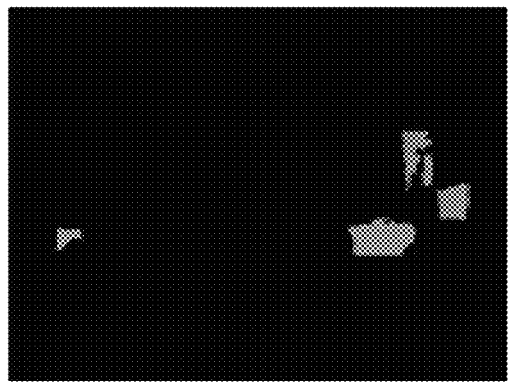
Figure 7:
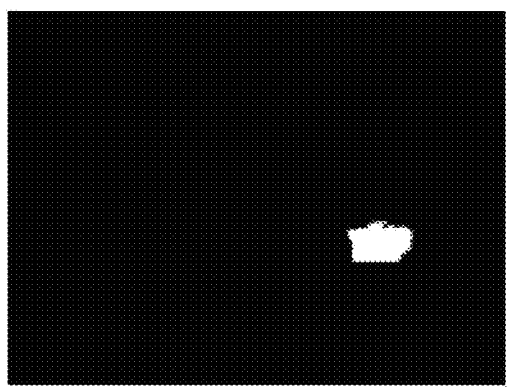
Figure 7:
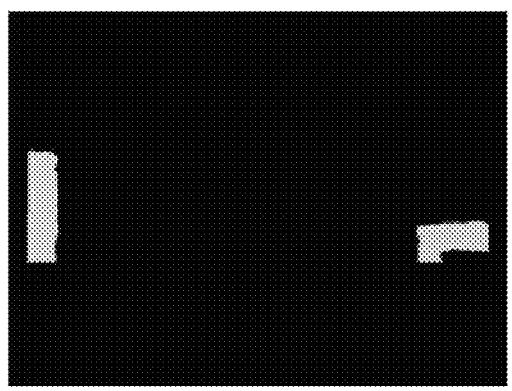
Figure 7:
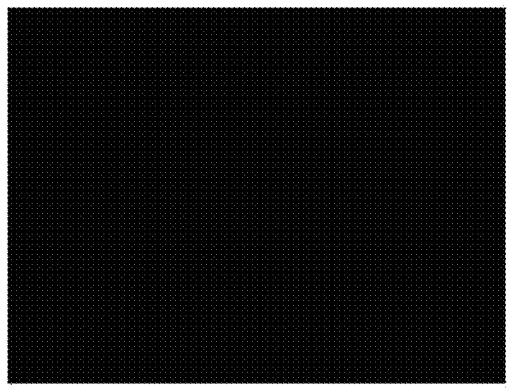
Figure 8:
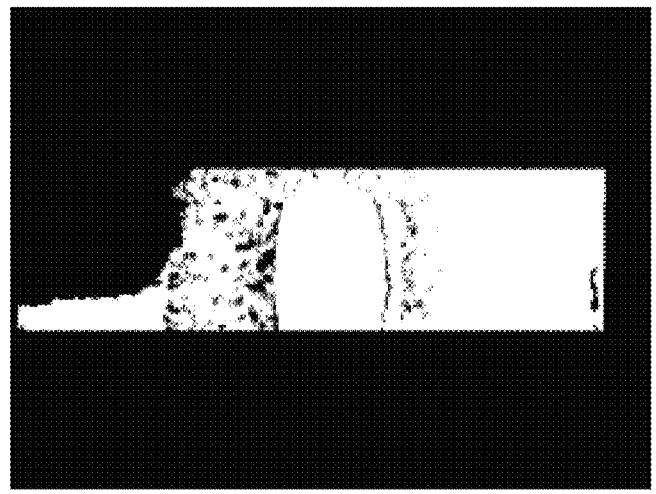
Figure 8:
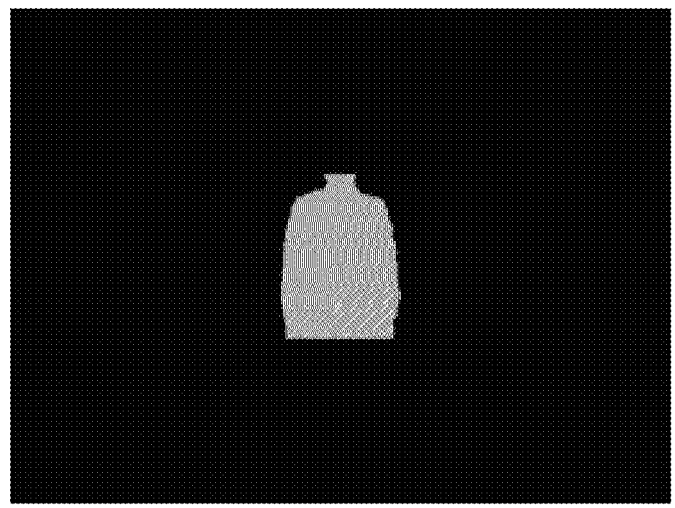

In step S134, candidate regions for a region corresponding to the target are created in relation to at least one pixel object. This process refers to an operation of detecting the candidate regions with respect to pixel objects remaining after pixel objects determined as noise have been removed in step S133. Referring to FIG. 7, the candidate regions are created from a plurality of pixel groups decomposed based on the depth information after a labeling process and a noise removing process have been performed. As shown in FIG. 7, a plurality of candidate regions can be detected as shown in FIGS. 7(a) to 7(f) after removing or deforming portions of the pixel groups decomposed and created in FIG. 5.

FIG. 8(a) shows an image of a candidate region detected when an image is not processed by dividing the image according to the sections of depth values according to the disclosure, and FIG. 8(b) shows a candidate region according to the disclosure. As recognized by comparing two images with each other, a surrounding environment or an object having a depth value similar to that of the person can be distinctively separated or removed by dividing and processing the image according to the sections of depth values.

Thereafter, if the pixel objects are detected as the candidate regions, the step of verifying if each candidate region is matched with the target is required.

Figure 9:
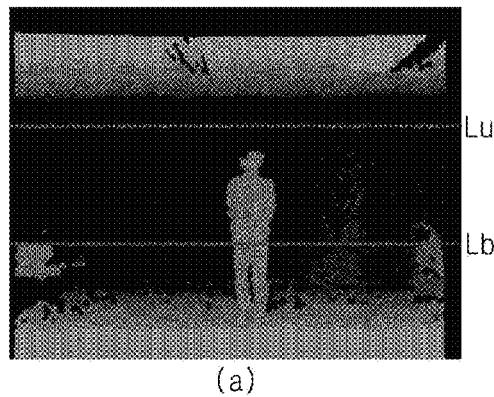
FIGS. 9 to 10 are views showing examples of images processed in a process of determining if the candidate region is matched with a target in the image processing method according to one embodiment of the disclosure.
Figure 9:
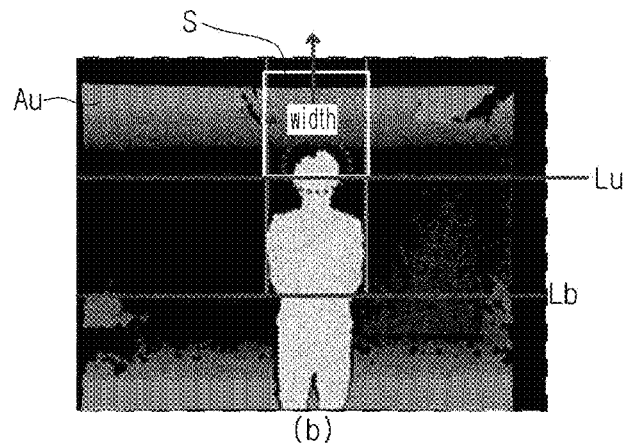
Figure 9:
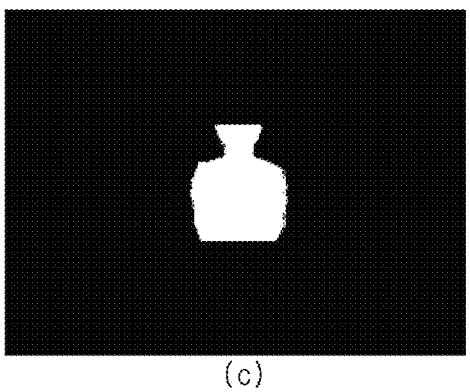
Figure 10:
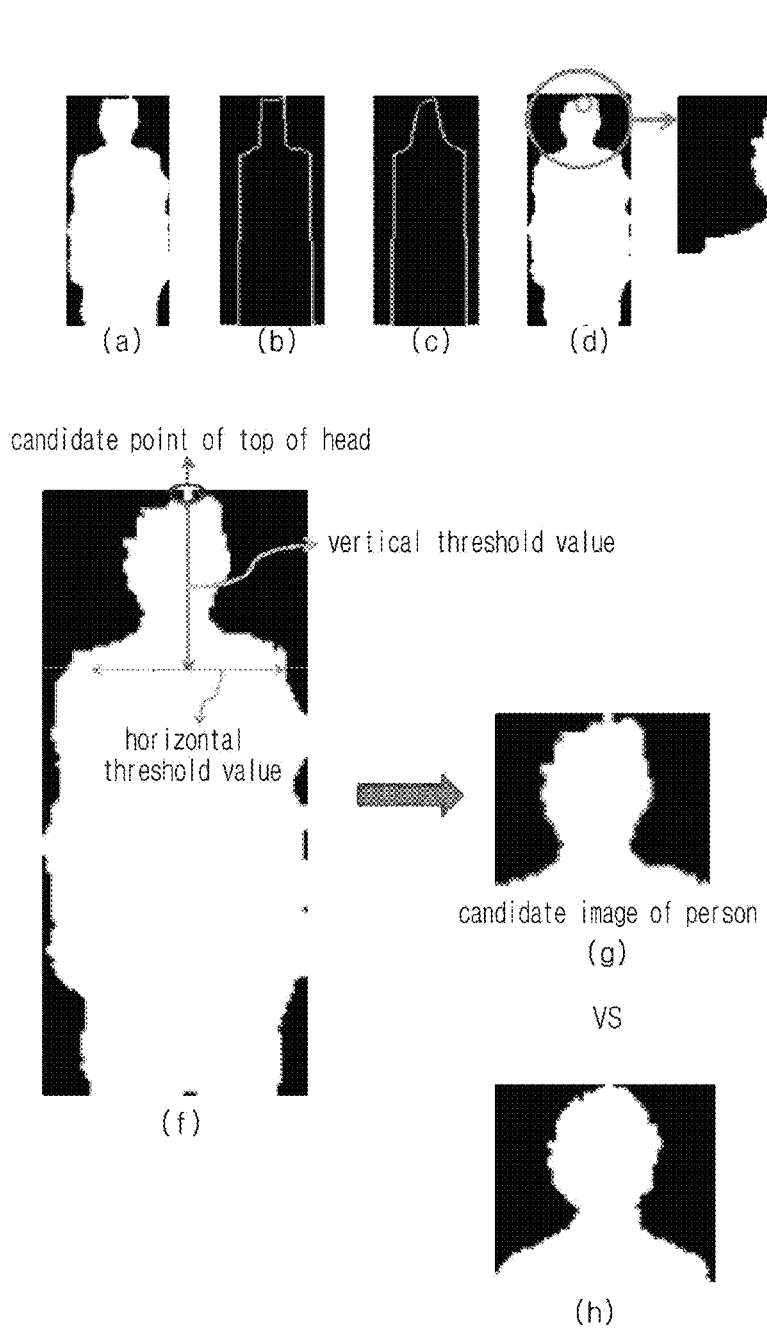

FIGS. 9 and 10 show examples of an image processed in the process of determining if the candidate region is matched with the target in the image processing method according to one embodiment of the disclosure.

Meanwhile, although the matching process is to determine if the shape of the candidate region is similar to the shape of the omega, which is the shape of a person serving as the target, since a portion of the target may be detected in a truncated state when the candidate region is detected, the recovery of the target is required.

Referring to FIG. 9(a), when the head of the person exists in the ROI, since the detected candidate region includes the shape of the omega, the recovery of the target is not required.

Meanwhile, referring to FIG. 9(b), when the person is positioned closely to a camera so that the head of the person exists beyond the ROI, the shape of the candidate region may not be matched with the shape of the target as shown in FIG. 9(c), so that the recovery of the target is required. In this case, since only a portion of the target shown in FIG. 9(b) must be recovered, a recovery work may be performed with respect to a partial area S of a region Au.

A determination regarding if the recovery of the target is required may be made depending on if the upper end of the candidate region meets the boundary line Lu.

The recovery process may require a series of processes performed in steps S12 to S13. However, the computational process may be simplified because the pixel object may be recovered in relation to a partial area of the region Au and the depth of the region Au. In detail, the image for the partial area S of the region Au is divided into a plurality of pixel objects. In this case, the image is not divided with respect to the whole depth range, but divided with respect to a partial depth range because only the section including the candidate region, for example, only the second section of FIG. 5 may be divided into pixel objects.

In addition, regarding the division scheme, the average depth value of the candidate region is set to a reference depth value pivot, and the candidate region may be divided into pixel objects corresponding to unit sections formed about the reference value. If the steps S12 and S13 related to the division into the pixel objects and the detection of the candidate region are perform, a portion of the target region existing in the part Au provided above the boundary line Lu can be recovered.

In other words, if a part of the target exists beyond the first ROI after determining if the part of the target exists beyond the first ROI, the part of the target existing beyond the first ROI is recovered, thereby exactly performing the process of detecting the target.

Hereinafter, a process of determining if the target is matched with the candidate region will be described with reference to FIG. 10. The matching process may be performed by performing template matching based on the preset shape of the upper body of a person on the assumption that the upper portion of the candidate region is a portion of the upper body of the person. In this case, since the upper body of the person must be extracted, the top point of the head of the person is detected.

FIG. 10(a) represents a candidate region. In order to detect the top point of the head of the person, as shown in FIG. 10(b), the outline of the candidate region is extended in a direction of −y axis. As shown in FIG. 10(b), the y-axis uppermost point of the pixels is extended in the direction of −y axis so that one line is formed. In this case, the y-axis uppermost point may be linked to the lowermost point of the candidate region.

Thereafter, as shown in FIG. 10(c), the noise of the outline is removed through a smoothing process. The smoothing process is performed, thereby inhibiting an undesirable point from being detected as a local maximum point. The local maximum point is a point at which the slope of the outline is changed from a positive direction to a negative direction, and used to detect the top point of the head of the person in the candidate region. Accordingly, the smoothing process is performed so that the undesirable point can be inhibited from being detected as the local maximum point.

Subsequently, as shown in FIG. 10(d), the local maximum point is extracted from the candidate region subject to the smoothing process, and may be detected as a top point C of the head. According to the disclosure, the local maximum point may be explained as a candidate point for the top of the head.

If the top point C of the head is detected, the candidate image is created by using a vertical threshold value extending from the top point C to the lower end and a horizontal threshold value extending in bi-directions from the top point C. According to the disclosure, the horizontal threshold value may be set to a real length of 15 cm, and the vertical threshold value may be set to a value of 30 cm. The number of pixels corresponding to the horizontal and vertical threshold values is calculated through Equation 1, and a person candidate image is detected from the candidate region (see FIG. 10(g)). Next, the detected person candidate image is compared with a person sample image shown in FIG. 10(h) in terms of similarity. Before the similarity is compared, the person candidate image may be resized so that the person candidate image is matched with the person sample image.

Figure 4:
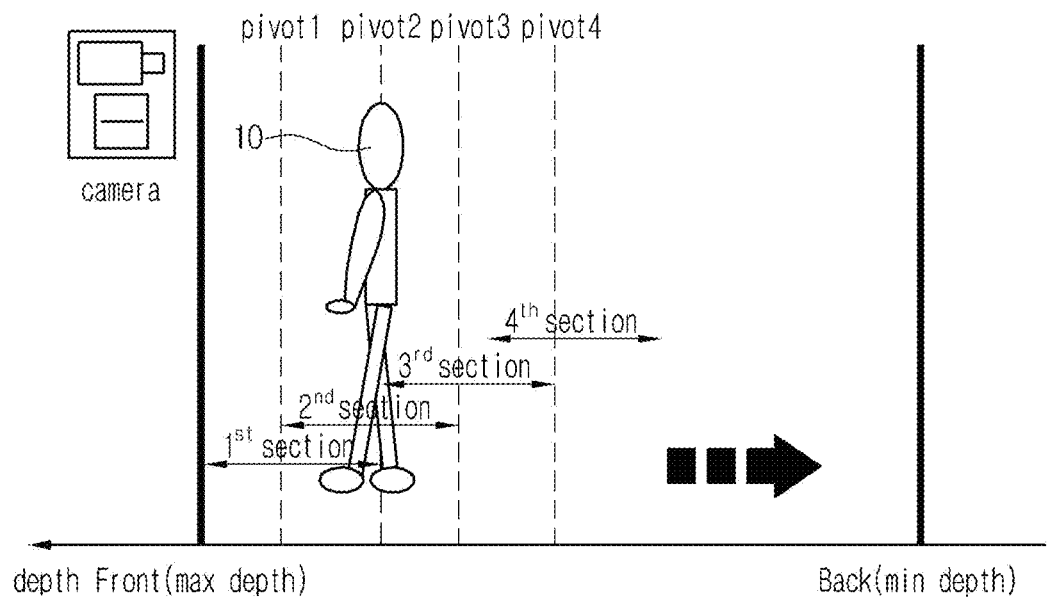
Figure 4:
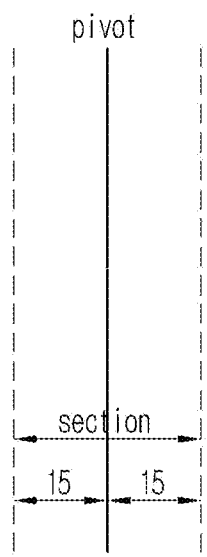

Referring to FIG. 10(h), the person sample image may have the shape of the omega, and may be compared with the person candidate image in terms of similarity by using a normalized cross correlation (NCC) scheme as shown in FIG. 4.

In other words, on the assumption that a template image is expressed as It, and a person candidate image is expressed as Iq, the similarity between images may be found through following Equation 4.

$$NCC(I_t, I_q) = \frac{1}{n-1} \sum_{x,y} \frac{(I_t(x,y) - \overline{I_t})(I_q(x,y) - \overline{I_q})}{\sigma_t \sigma_q} \quad \text{Equation 4}$$

In this case, n refers to the number of pixels constituting the person sample image, $\overline{I_t}$ refers to the average pixel value of the template image, $\overline{I_q}$ refers to the average pixel value of the person candidate image, and $\sigma_t$ or $\sigma_q$ refer to the standard deviation of the average pixel value of each image If the value of NCC(It, Iq) is lower than a threshold value, for example, a value of 0.6 to 0.7, the person candidate image may be determined as a person image.

Figure 11:
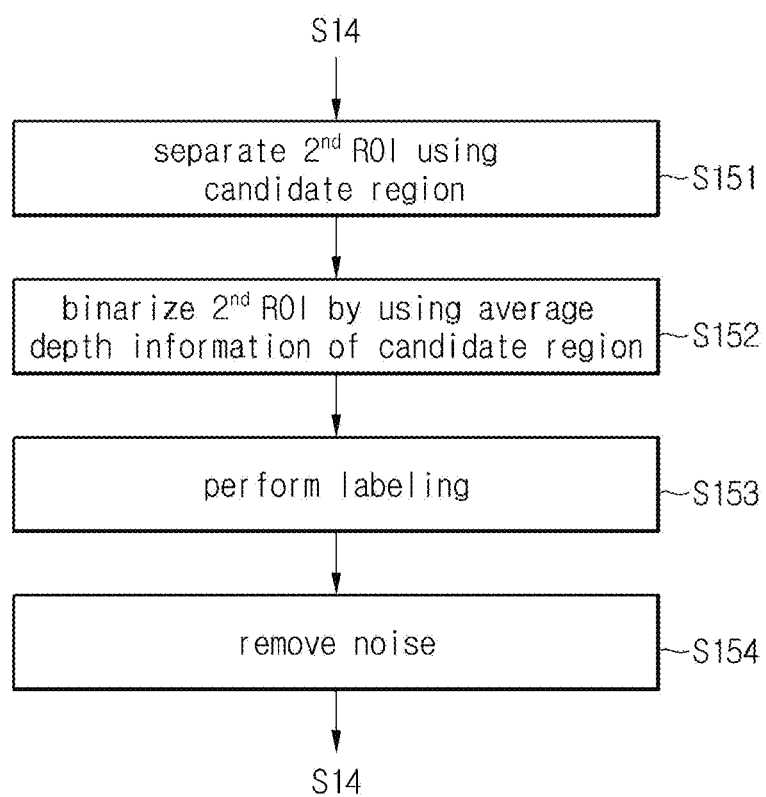
FIG. 11 is a detailed flowchart showing a scheme of detecting a target region in the image processing method according to one embodiment of the disclosure.
Figure 12:
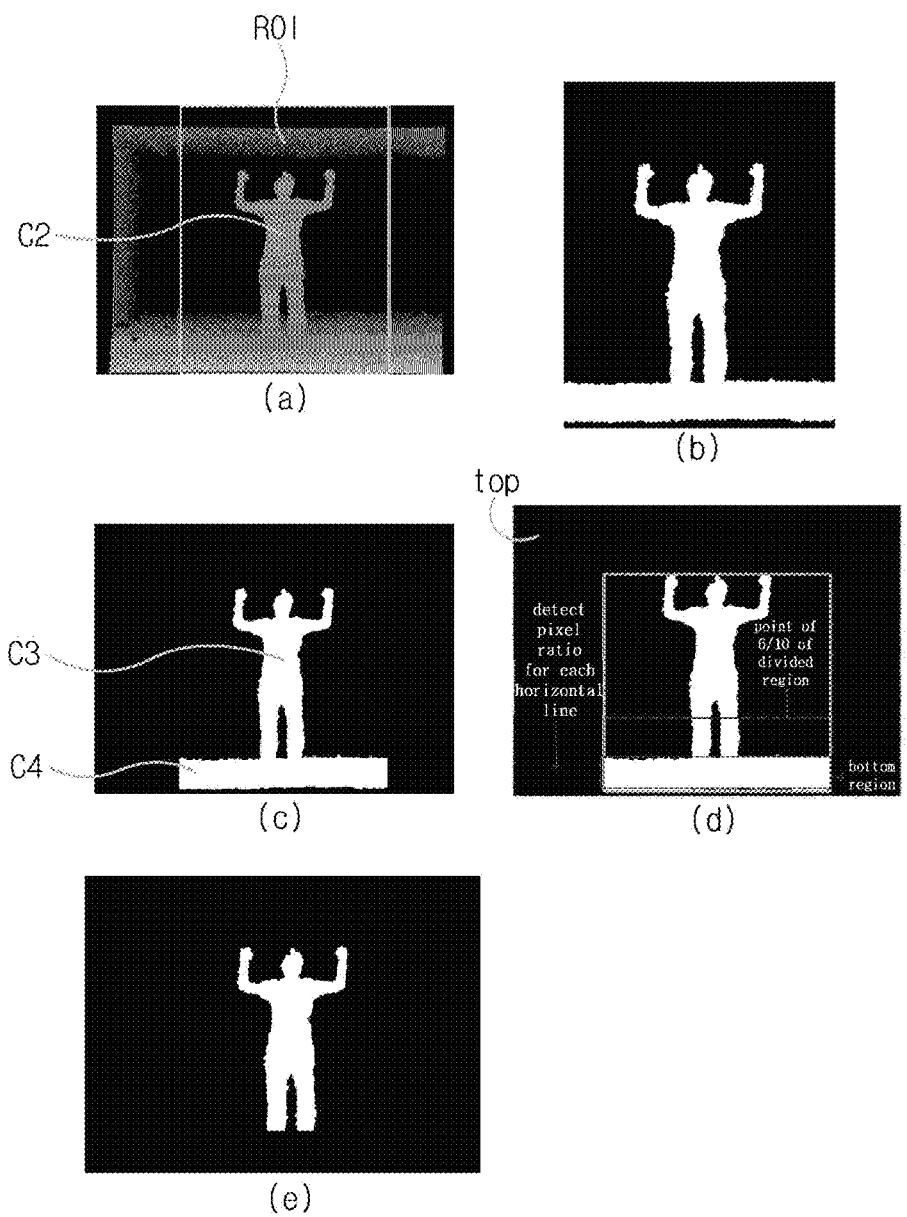
FIG. 12 shows images processed in the process of detecting the target region in the image processing method according to one embodiment of the disclosure.

FIG. 11 is a detailed flowchart showing a scheme of detecting a target region in the image processing method according to one embodiment of the disclosure, and FIG. 12 shows images processed in the process of detecting the target region in the image processing method according to one embodiment of the disclosure. Hereinafter, the processes of detecting the target region of FIG. 11 will be described together with FIG. 12. The process of detecting the target region may be performed in order to detect the final target region from the candidate region.

In step S151, the second ROI is separated by using the detected candidate region. Referring to FIG. 12(a), the image is divided in a vertical direction by using the width of the candidate region C2 detected in the shape of the person, and an intermediate region including the candidate region C2 is separated as the second ROI.

In step S152, the second ROI is binarized based on the average depth information of the candidate region C2. For example, if the average depth information of the candidate region C2 is 175, the pixel object having a depth value in the range of 160 to 190, which is a range from a value less than 175 by 15 to a value greater than 175 by 15, is extracted, and the extracted pixel object may be processed to have the maximum depth value of 255, and remaining regions may be processed to have the minimum dept value of 0.

In other words, the pixel object existing in a predetermined range from the average depth information of the candidate region is binarized. The predetermined range is set to predetermined values, but the disclosure is not limited thereto.

In step S153, the binarized second ROI is subject to a labeling process. In the labeling process, the largest object among binarized pixel objects is defined as a body region, and the labeling process is performed based on the body region. In other words, the labeling process may be performed on the assumption that noise or other objects contained in the second ROI is smaller than the body region. This is because the binarization process is performed with respect to the candidate region C2 verified as a person based on the average depth value of the candidate region C2, so that noise or other objects may not be larger than the person. FIG. 12(c) represents the second ROI subject to the labeling process. Referring to FIG. 12(c), a body region C3 of the person and a bottom region C4 of the person can be detected. In this case, the bottom region C4 may not be removed. Referring to FIG. 12(d), since the body region C3 has depth information similar to that of the bottom region C4 around the body region C3, the body region C4 may be detected together with the bottom region C3. First, a line is set at a point corresponding to 6/10 of the body region C3 downward from the top of the body region C3, and a pixel ratio can be detected downward from the line. As shown in FIG. 12(d), since the horizontal-axis pixels occupies the bottom region C4 at the high ratio, if the ratio of the horizontal-axis pixels occupying the bottom region C4 is at least 80%, the horizontal-axis pixels may be determined as a starting point of the bottom surface.

In step S154, if the noise of the second ROI subject to the labeling process is removed, the target region may be created. In detail, the target region may be created by removing the region C4 determined as a floor.

FIG. 12(e) shows the final image without the bottom region. In other words, according to the disclosure, the candidate region is detected by taking only the first ROI into the consideration, and a portion of a target included in remaining regions other than the first ROI is detected by using the detected candidate region, thereby creating the target region. The target region may be detected as a binarized image.

Figure 13:
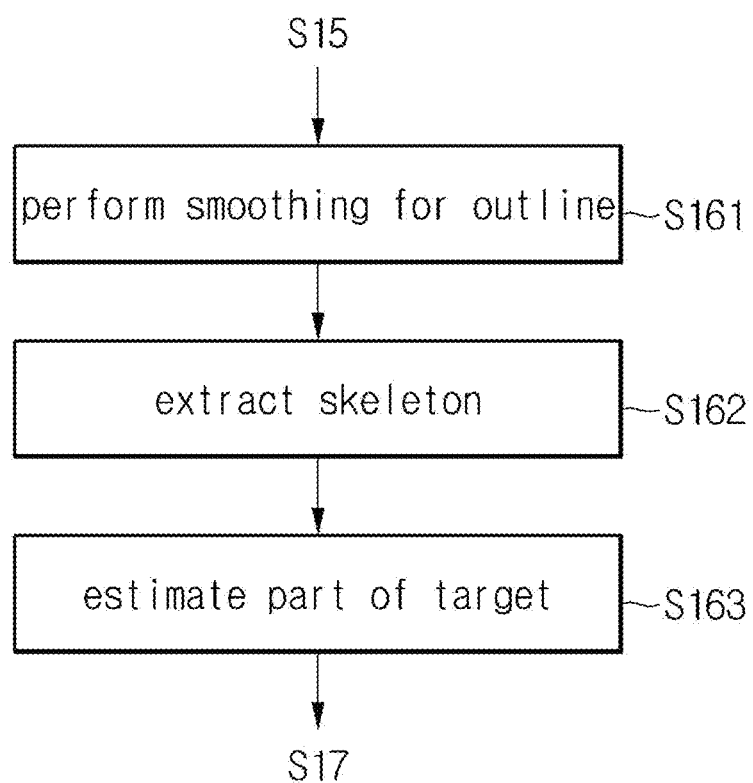
FIG. 13 is a detailed flowchart showing a scheme of estimating the pose of the target region in the image processing method according to one embodiment of the disclosure.
Figure 14:
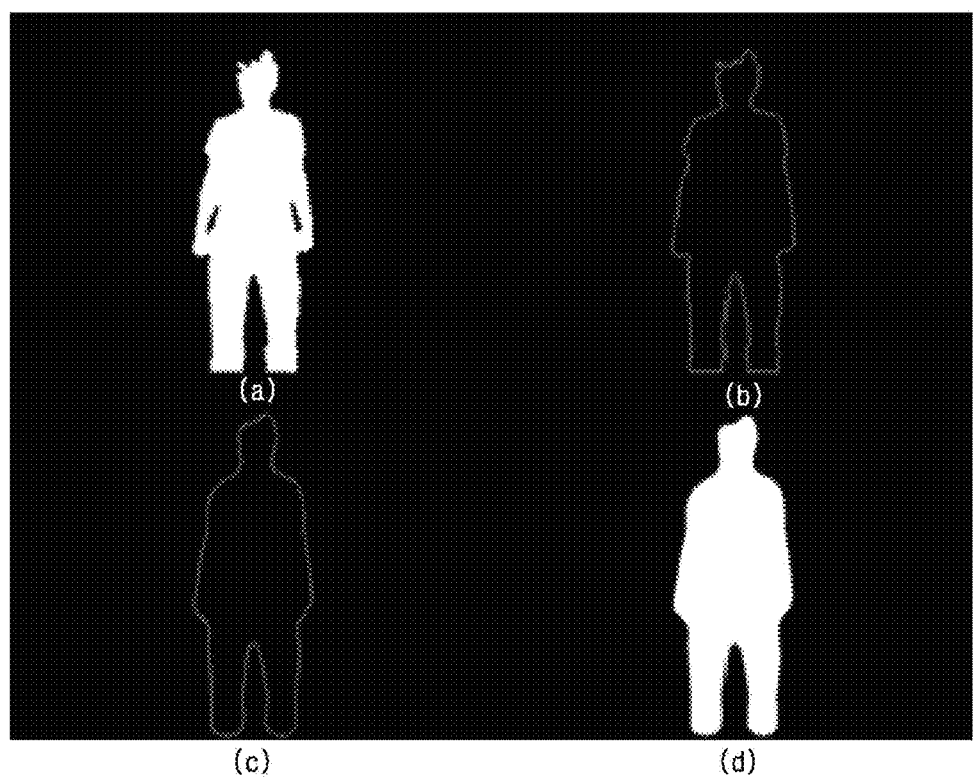
FIG. 14 shows images representing the outline of the target in the process of estimating the pose of the target region in the image processing method according to one embodiment of the disclosure.

FIG. 13 is a detailed flowchart showing a scheme of estimating the pose of the target region in the image processing method according to one embodiment of the disclosure, and FIG. 14 shows images representing the outline of the target in the process of estimating the pose of the target region in the image processing method according to one embodiment of the disclosure. The process of estimating the pose of the target region may employ the target region detected above, that is, a silhouette image. The silhouette image represents the maximum depth value of 255 in a body region, and the minimum depth value of 0 at another region.

In step S161, the smoothing process is performed with respect to the outline of the target region. FIGS. 14(a) to 14(d) show the target region which has been subject to the smoothing process. FIG. 14(a) represents the target region, FIG. 14(b) represents the outline extracted from the target region, FIG. 14(c) represents the outline subject to the smoothing process, and FIG. 14(d) represents a silhouette image created by using the outline subject to the smoothing process.

According to the disclosure, in order to estimate the pose of the target region, the skeleton of the image is used. However, the process of extracting the skeleton is sensitive to noise existing on the outline of the silhouette image. Accordingly, the smoothing process is required. The operation of the smoothing process may be performed based on a Radial sweep scheme of Equation 5.

$$x_i = \frac{\sum_{j=i-20}^{i+20} x_j}{41}, \quad \text{Equation 5}$$

$$y_i = \frac{\sum_{j=i-20}^{i+20} y_j}{41}$$

In Equation, $x_i, y_i$ refer to coordinates of x and y for an $i^{th}$ point of the outline.

In step S162, the skeleton of the target region subject to the smoothing process is extracted. When the skeleton is extracted, a distance transformer (DT) may be used.

In step S163, the parts of the target are estimated. The DT may be expressed through Equation 6.

$$D(p) = \operatorname{argmin}_{q \in R_{nb}} d(p,q) \quad \text{Equation 6}$$

Figure 15:
FIG. 15 shows images processed in the process of extracting the skeleton of the target in the image processing method according to one embodiment of the disclosure.
Figure 15:
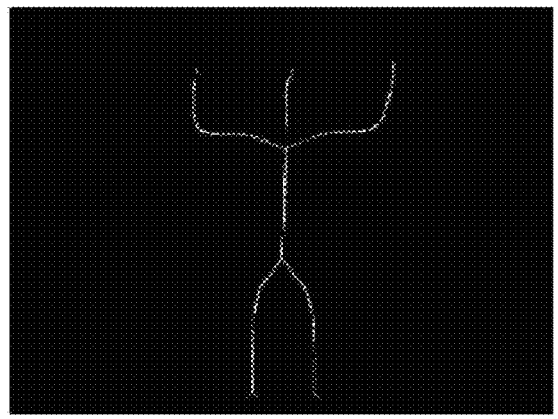
Figure 16:
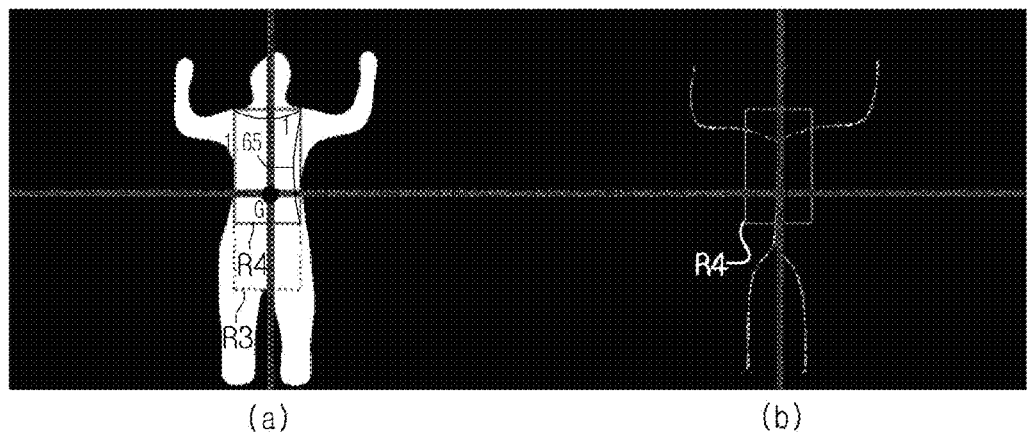
FIGS. 16 to 19 are views showing images processed in the process of estimating the pose of the target region and modeling the target in the image processing method according to one embodiment of the disclosure.

In Equation 6, d(p,q) is a function to find the distance between pixels p and q. The result of the DT represents a high value when a related pixel is far away from the outline. When calculating the distance, Euclidean distance may be used. FIG. 15(a) shows the image subject to DT, in which the skeleton of the image far away from the outline is brightly expressed, and a portion of the image close to the outline is darkly expressed. FIG. 15(b) shows an image obtained by normalizing the image subject to the DT.

In this case, the skeleton image may be created through Equation 7 employing the DT $$S(x, y) = \begin{cases} 255, & \text{if } G \times (N_L - N_H) + D(x, y) \geq T_0 \\ 0, & \text{otherwise} \end{cases} \quad \text{Equation 7}$$

In Equation 7, $N_L$ and $N_H$ refer to the number of pixels having a brightness value less than that of the central pixel of each window, and the number of pixels having a brightness value greater than that of the central pixel of each window. G refers to a gain serving as a factor to determine the amplification degree of the difference between the values of and $N_L$ and $N_H$. For example, G may be set 14. The threshold TO may be set to 180. The skeleton image created based on the above Equations and the input values is shown in FIG. 15(c). Since the skeleton image is represented as one of 255 and 0 as shown in Equation 7, the skeleton line of the skeleton image may be discretely represented.

FIGS. 16 to 19 are views showing images processed in the process of estimating the pose of the target region and modeling the target region in the image processing method according to one embodiment of the disclosure.

Referring to FIG. 16(a), the central part of the target, for example, the body of the target is estimated by using the target region. When estimating the body of the target, the center of the gravity (G) of the silhouette image is calculated, and a rectangle is set based on the center of the gravity (G) in the silhouette image. The rectangle may employ the center of the gravity (G) as the center of the gravity thereof, and may be set as the greatest rectangle R3 that may be included in the silhouette image. The rectangle R4 is set by removing a partial region of the rectangle R3 including the lower edge thereof so that the rectangle R4 has the ratio similar to that of the upper body of the person. For example, the ratio may be 1:1.95.

If the body of the person is estimated from the silhouette image, the body part R4 may be estimated from the skeleton image as shown in FIG. 16(b).

Figure 17:
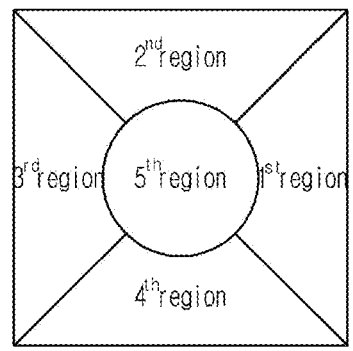
Figure 17:
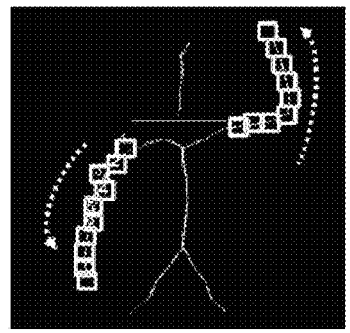
Figure 17:
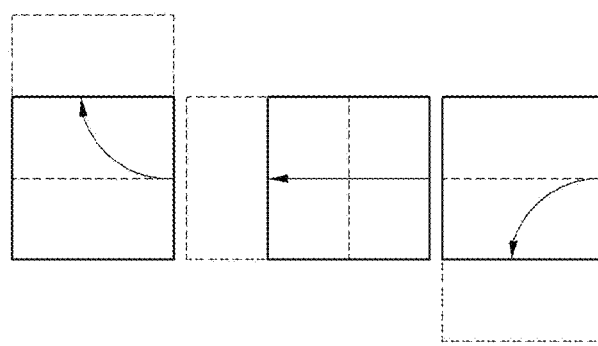
Figure 17:
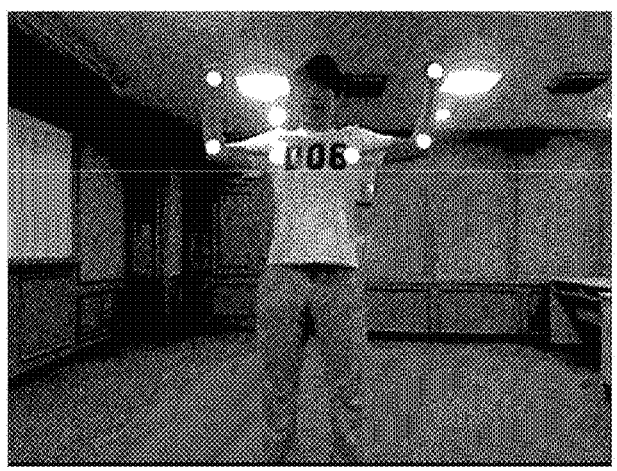
Figure 18:
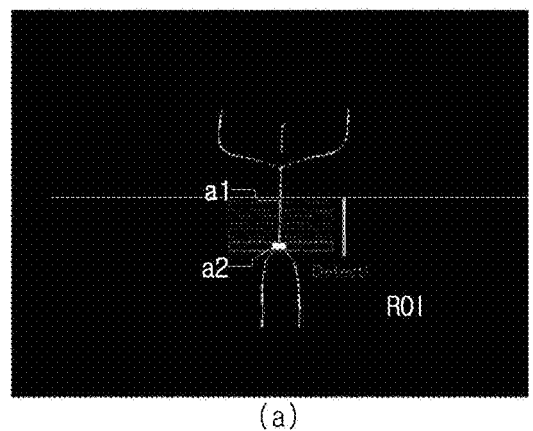
Figure 18:
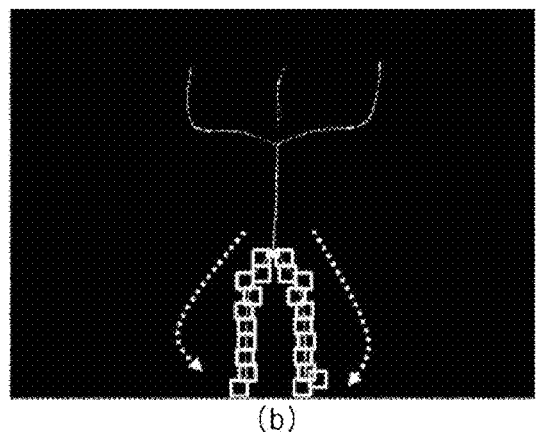
Figure 18:
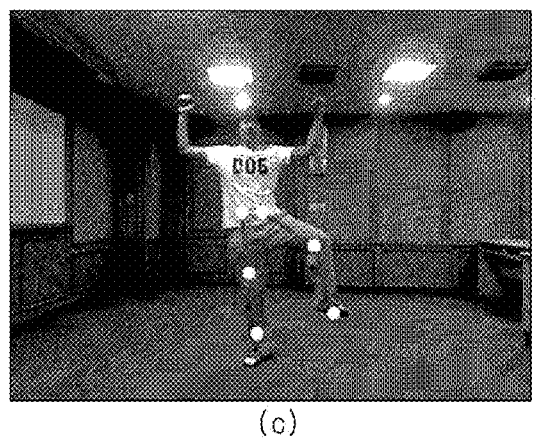
Figure 19:
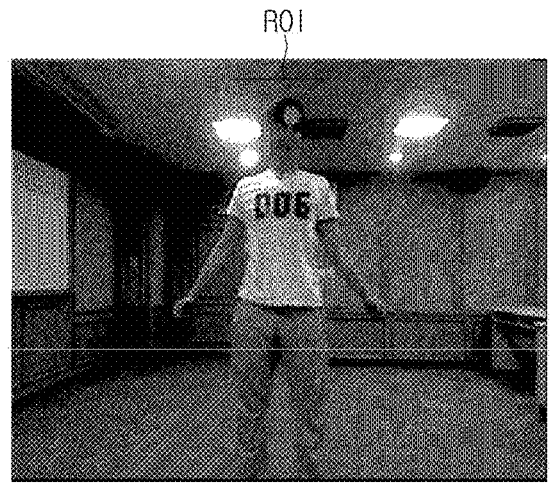
Figure 19:
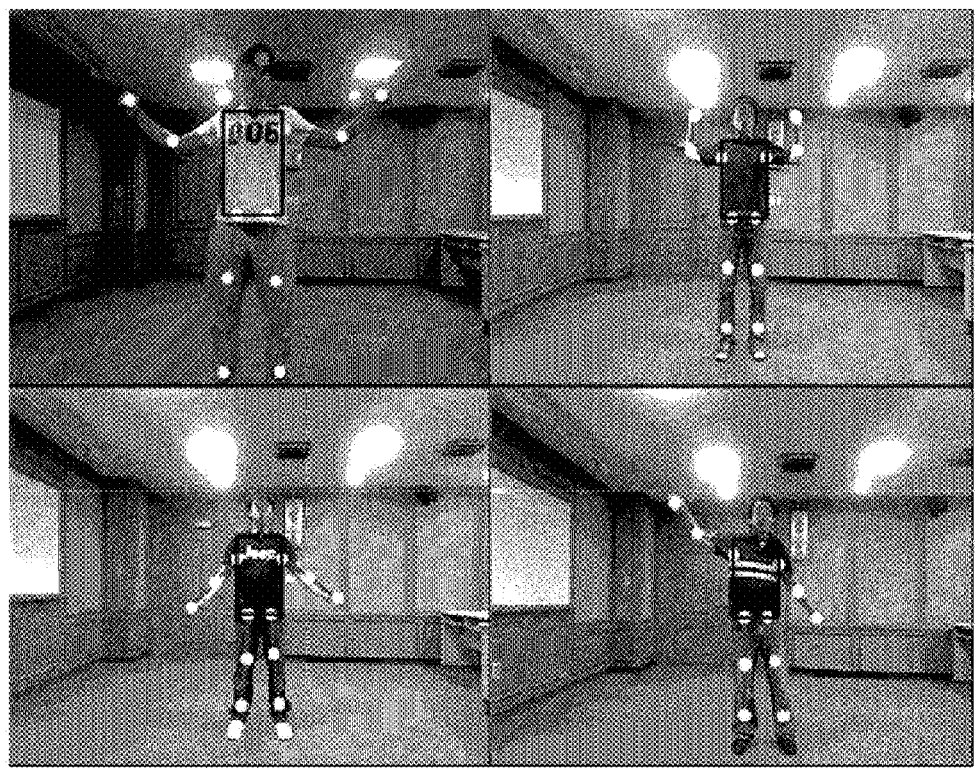

FIG. 17 shows image processing to estimate sub-parts of the person. The sub-parts of the person, for example, the arm and the leg of the person may be estimated by using a directional window on the assumption that the sub-parts of the person are positioned at the left and right sides of the body part. Meanwhile, since data constituting the skeleton image are discrete, the modeling suitable for each part of the person is performed while continuously generating the data. According to the disclosure, the directional window and a linear least square approximation scheme is used for the modeling purpose.

FIG. 17(a) shows the directional window according to the disclosure. As shown in FIG. 17(a), the directional window may be divided into five window regions. Referring to FIG. 17(b), skeleton pixels constituting the arm part of the person may be collected from the skeleton image having the estimated body part while moving the directional window regions #1, #2, #3, . . . , and #N. As shown in FIG. 17(b), the window direction is determined while starting from the window region #1. The window is moved to window regions #2, #3, . . . , and #N along the determined window direction.

Referring to FIG. 17(c), regarding the moving principle of the window, the starting pixel is first determined, and a determination is made regarding a window region among five window regions to which a next pixel spaced apart from the starting pixel is directed. Accordingly, the window may be moved along the determined direction. As shown in FIG. 17(b), first, a starting pixel is in the window region #1, and the window direction is moved toward the window region #2, Second, the starting pixel is in the window region #1, and the window direction is moved toward the window region #3. Third, the starting pixel is in the window region #1, and the window direction is moved toward the window region #4. In this case, in order to determine the moving direction of the directional window, a linear least square approximation scheme may be used.

The linear least square approximation scheme may be expressed through following Equation 8.

$$a_1 = \frac{n\sum x_i y_i - \sum x_i \sum y_i}{n\sum x_i^2 - (\sum x_i)^2},$$

$$a_0 = \bar{y} - a_1 \bar{x}$$

Equation 8

In Equation 8, a1 refers to the slop of a straight line, a0 refers to a y-intercept, n refers to the number of data to be modeled, and $x_i$, $y_i$ refer to an x-intercept and a y-intercept of an $i^{th}$ point, respectively. The skeleton image may be modeled by using one or two straight lines through the linear least square approximation scheme. In this case, if the standard error of estimate $s_{y/x}$ caused in the process of moving the window is a great value, the data may not be modeled by using one straight line. Accordingly, the arm part may be modeled by using two straight lines, so that the error rate may be reduced.

The $s_{y/x}$ may be calculated through Equation 9.

$$s_{y/x} = \sqrt{\frac{S_r}{n-2}},$$

$$S_r = \sum_{i=1}^{n} (y_1 - a_0 - a_1 x_1)^2$$

Equation 9

FIG. 17(d) shows an image in which the arm, which is the sub-part, is modeled by using the linear least square approximation scheme and the directional window.

Meanwhile, similarly to the arm, the leg may be modeled by using the linear least square approximation scheme and the directional window. The estimation of the leg is different from the estimation of the arm in that the starting point of the leg does not start from the body R4. In order to estimate the leg, the starting point must be detected.

Referring to FIG. 18(a), the lower portion of the rectangle of the estimated body is set as the ROI. The standard deviation for the point x of the skeleton pixel is calculated downward from the skeleton pixel a1 meeting the lower end of the body. In this case, if the point x1 reaches a pixel a2, from which the leg starts, the standard deviation may be rapidly changed. This point may be set as the starting point for estimation of the leg. As shown in FIG. 18(b), the directional window is moved from the starting point a2 to estimate the leg. As shown in FIG. 18(c), the estimated leg is modeled by using the linear least square approximation scheme and the directional window. The details of the directional window and the linear least square approximation scheme will be omitted since the directional window and the linear least square approximation scheme have been described in the estimation of the arm.

FIG. 19(a) shows one example of image processing to estimate of the neck. As shown in FIG. 19(a), the upper end of the body is set as the ROI on the assumption that the neck is provided on the upper end of the rectangle of the estimated body, and the linear least square approximation scheme is performed with respect to the pixels existing in the ROI to model the neck. In this case, the position of the head may be estimated on the assumption that the head is positioned on the end portion of the neck skeleton.

FIG. 19(b) shows an image of a person modeled based on the linear least square approximation scheme.

Figure 20:
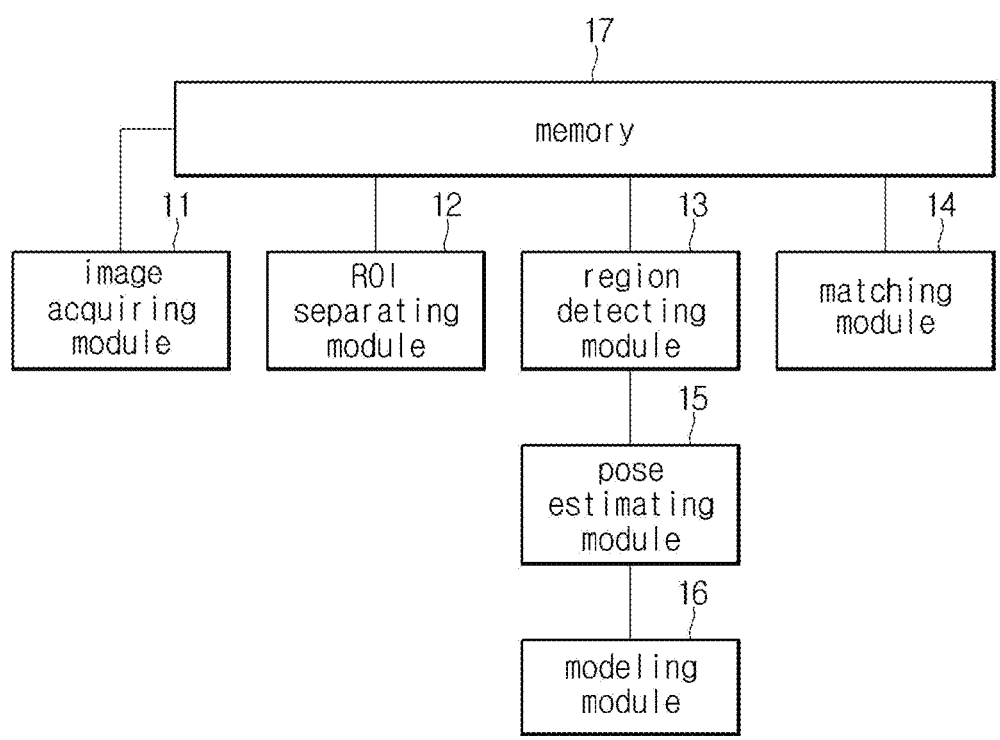
FIG. 20 is a block diagram showing the structure of an image processing apparatus according to one embodiment of the disclosure.

FIG. 20 is a block diagram showing the structure of an image processing apparatus 10 according to one embodiment of the disclosure. Referring to FIG. 20, the image processing apparatus 10 according to one embodiment of the disclosure may include an image acquiring module 11 to acquire the depth information of an image, an ROI separating module 12 to separate a first ROI for the target region from the image, a region detecting module 13 to detect a candidate region for the target from the first ROI, and a matching module 14 to determine if the detected candidate region is matched with the target. The region detecting module 13 may include a candidate region detecting module and a target region detecting module. If the candidate region is matched with the target, the region detecting module 13 may detect the target by using the candidate region. In addition, the image processing apparatus 10 may further include a pose estimating module 15 to estimate the pose of the target by using the target region and a modeling module 16 to model the target. Further, the image processing apparatus 10 may further include a memory 17 to store modeling image, the depth information of the image, a plurality of pixel objects, a candidate region, and a final region created in each image processing step. The memory 17 may be connected to all modules constituting the image processing apparatus 10 and provide a memory for read/write of data required by the modules. The memory may include an HDD, a flash memory, a RAM, and a ROM.

The image acquiring module 11 may acquire the depth information of the image. The image acquiring module 11 may include a hardware, such as modules including a stereo camera, a laser scanner, and an ultrasonic device, to extract the depth information of the image. In addition, the image acquiring module 11 may include an operating processor to calculate the depth information of the image by using the input information. For example, in order to acquire the depth information from the stereo image, the real information or the relative depth value must be calculated by using the reference value (the distance between cameras) of the left and right cameras, and the difference between the left and right images. Accordingly, the image acquiring module 11 may include a processor to perform the operating process.

The ROI separating module 12 divides the image into a plurality of regions, and a part of the divided plural regions may be set.

The region detecting module 13 may include a candidate region creating module which decomposes the image of the first ROI into a plurality of pixel sets based on the depth information, creates at least one pixel object by performing a labeling work with respect to each decomposed pixel set, removes the pixel object determined as noise by analyzing the pixel object, and creates the candidate region for a region corresponding to the target in relation to at least one pixel object which is not determined as noise.

In this case, the candidate region detecting module sets a plurality of reference depth values with respect to the whole range of the depth information of the image and extracts the pixel sets existing in unit sections preset based on the set reference depth values, when decomposing the image of the first ROI into the pixel sets.

In addition, the candidate region detecting module may remove the pixel object determined as noise by analyzing the pixel object when satisfying at least one of the case that the number of pixels constituting at least one pixel object is equal to or less than a preset threshold (first condition), the case that the width of the rectangle surrounding the outer portion of at least one pixel object is equal to or less than the preset threshold value (the second condition), the case that the ratio of the number of pixels contained in the rectangle surrounding the outer portion of the at least one pixel object exists beyond a preset threshold range (the third condition), and the case that the at least one pixel object is spaced apart from a portion of the boundary line to divide the image into a plurality of regions (the fourth condition).

The region detecting module 13 separates the second ROI by using the detected candidate region, and performs a binarization process with respect to the second ROI by using the average depth information of the candidate region.

Then, the region detecting module 13 performs a labeling process with respect to the second ROI that is binarized, and detects the target region by removing the noise of the second ROI subject to the labeling process.

The matching module 14 can determine if a portion of the target exists beyond the first ROI, and recover the portion of the target existing beyond the first ROI if the portion of the target exists. In addition, the matching module 14 determines the similarity between the candidate region and a sample image by comparing the candidate region with the sample image to determine if the detected candidate region corresponds to the target.

The pose estimating module 15 may perform the smoothing process with respect to the outline of the target region, extracts the skeleton of the target region, and estimates parts constituting the target to estimate the pose of the target region. In addition, the pose estimating module 15 estimates the central part by using the center of the gravity of the target region, and estimates the sub-part by using the central part to estimate the pose of the target region.

Meanwhile, although FIG. 20 independently shows modules constituting the image processing apparatus 10 according to functions, the modules may be integrally mounted on one process.

In the above description, the image processing method according to one embodiment of the disclosure has been described. The image processing method according to one embodiment of the disclosure is applicable to a scheme of estimating the motion of the modeled target and employing a user interface to input related motion information, and may be stored in a computer-readable recording medium in the form of electronic record codes.

In addition, the image processing apparatus according to the disclosure may be realized as a user interface device such as a computer, a network TV, a game player, a smart TV, and a laptop computer, or may be mounted on the user interface device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image processing method comprising:
    acquiring depth information of an image;
    dividing the image into a plurality of regions based on the acquired depth information;
    setting a portion of the divided regions to a first region of interest;
    setting a plurality of reference depth values with respect to an entire range of the depth information of the image;
    extracting pixel sets existing in a preset unit section formed about the plurality of reference depth values to decompose the image of the first region of interest into the pixel sets;
    creating at least one pixel object by performing a labeling process with respect to each pixel set;
    removing a pixel object determined as noise by analyzing the pixel object;
    creating a candidate region for a region corresponding to the target in relation to at least one pixel object which is not determined as noise;
    determining if the detected candidate region corresponds to the target;
    detecting a target region by using the candidate region if the candidate region corresponds to the target;
    estimating a pose of the target by using the detected target region; and
    performing modeling with respect to the target;
    wherein each section formed about each reference depth value is overlapped with an adjacent section.

2. The image processing method of claim 1, wherein an interval between the plurality of reference depth values is equal to or less than a size of the unit section.

3. The image processing method of claim 1, wherein the removed pixel object corresponds to one of a first case in which a number of pixels constituting the at least one pixel object is less than a preset threshold value; a second case in which a width of a rectangle surrounding an outer portion of the at least one pixel object is less than a preset threshold value; a third case in which a ratio of a number of pixels contained in the rectangle surrounding the outer portion of the at least one pixel object exists beyond a preset threshold range; and a fourth case in which the at least one pixel object is spaced apart from a portion of a boundary line to divide the image into the regions.

4. The image processing method of claim 1, wherein the determining if the detected candidate region corresponds to the target comprises: determining if a portion of the target exists beyond the first region of interest; recovering the portion of the target existing beyond the first region of interest if the portion of the target exists beyond the first region of interest; and determining similarity between the candidate region and a sample image by comparing the candidate region with the sample image; wherein the portion of the target is recovered based on the unit section including the candidate region.

5. The image processing method of claim 1, wherein the detecting of the target region by using the candidate region if the candidate region corresponds to the target comprises: separating a second region of interest by using the detected candidate region; performing a binarization process with respect to the second region of interest by using average depth information of the candidate region; performing a labeling process with respect to the second region of interest subject to the binarization process; and removing noise from the second region of interest subject to the labeling process.

6. The image processing method of claim 1, wherein the estimating of the pose of the target by using the detected target region comprises: smoothing an outline of the target region; extracting a skeleton of the target region; and estimating parts constituting the target.

7. The image processing method of claim 6, wherein the estimating of the parts constituting the target comprises: estimating a central part by using a center of gravity of the target region; and estimating a sub-part by using the central part.

8. An image processing apparatus comprising:
a memory; and
a processor for performing the following operations:
acquiring depth information of an image;
module separating a first region of interest for a region in which a target exists, from the image;
detecting a candidate region for the target from the first region of interest;
determining if the candidate region corresponds to the target;
estimating a pose of the target by using the target region which is detected by using the candidate region as the candidate region corresponds to the target; and
modeling the target;
wherein separating a first region of interest comprises dividing the image into a plurality of regions, and setting a part of the divided regions to the first region of interest; and
wherein detecting a candidate region comprises:
setting a plurality of reference depth values with respect to an entire range of the depth information of the image;
extracting pixel sets existing in a preset unit section formed about the plurality of reference depth values to decompose the image of the first region of interest into the pixel sets;
creating at least one pixel object by performing a labeling process with respect to each pixel set;
removing a pixel object determined as noise by analyzing the pixel object; and
detecting the candidate region for a region corresponding to the target in relation to at least one pixel object which is not determined as noise;
wherein each section formed about each reference depth value is overlapped with an adjacent section.

9. The image processing apparatus of claim 8, wherein an interval between the reference depth values is equal to or less than a size of the unit section.

10. The image processing apparatus of claim 8, wherein detecting a candidate region comprises removing the pixel object determined as noise by analyzing the pixel object, and wherein a criterion to remove the pixel object includes one of a first case in which a number of pixels constituting the at least one pixel object is less than a preset threshold value, a second case in which a width of a rectangle surrounding an outer portion of the at least one pixel object is less than a preset threshold value, a third case in which a ratio of a number of pixels contained in the rectangle surrounding the outer portion of the at least one pixel object exits beyond a preset threshold range, and a fourth case in which the at least one pixel object is spaced apart from a portion of a boundary line to divide the image into the regions.

11. The image processing apparatus of claim 8, wherein determining if the candidate region corresponds to the target comprises determining if a portion of the target exists beyond the first region of interest, recovering the portion of the target existing beyond the first region of interest if the portion of the target exists beyond the first region of interest, determining similarity between the candidate region and a sample image by comparing the candidate region with the sample image, and determining if the candidate region corresponds to the target.

12. The image processing apparatus of claim 8, wherein detecting candidate region comprises detecting the target region by separating a second region of interest by using the detected candidate region, performing a binarization process with respect to the second region of interest by using average depth information of the candidate region, performing a labeling process with respect to the second region of interest subject to the binarization process, and removing noise from the second region of interest subject to the labeling process.

13. The image processing apparatus of claim 8, wherein estimating a pose of the target comprises estimating a pose of the target region by performing a smoothing process with respect to an outline of the target region, extracting a skeleton of the target region, and estimating parts constituting the target.

14. The image processing apparatus of claim 13, wherein estimating a pose of the target comprises estimating the pose of the target region by estimating a central part by using a center of gravity of the target region, and estimating a sub-part by using the central part.

* * * * *